United States Patent
Beasley

[15] 3,674,071
[45] July 4, 1972

[54] FATTING ATTACHMENT FOR SKINNING MACHINES

[72] Inventor: Donald L. Beasley, Des Moines, Iowa
[73] Assignee: Townsend Engineering Company, Des Moines, Iowa
[22] Filed: July 20, 1970
[21] Appl. No.: 56,319

[52] U.S. Cl. .......................................................146/130
[51] Int. Cl. ....................................................A22c 17/12
[58] Field of Search.............................................146/130

[56] References Cited

UNITED STATES PATENTS 2,715,427   8/1955   Townsend.............................146/130
3,207,197   9/1965   Wilcox..............................146/130 X Primary Examiner—Willie G. Abercrombie
Attorney—Zarley, McKee & Thomte

[57] ABSTRACT

A fatting attachment for skinning machines comprising a curved fatting blade mounted above the skinning blade of the machine. Adjustment means is secured to one end of the fatting blade so that the fatting blade can be moved toward and away from the skinning blade to vary the depth of the fatting blade in the fat.

4 Claims, 11 Drawing Figures

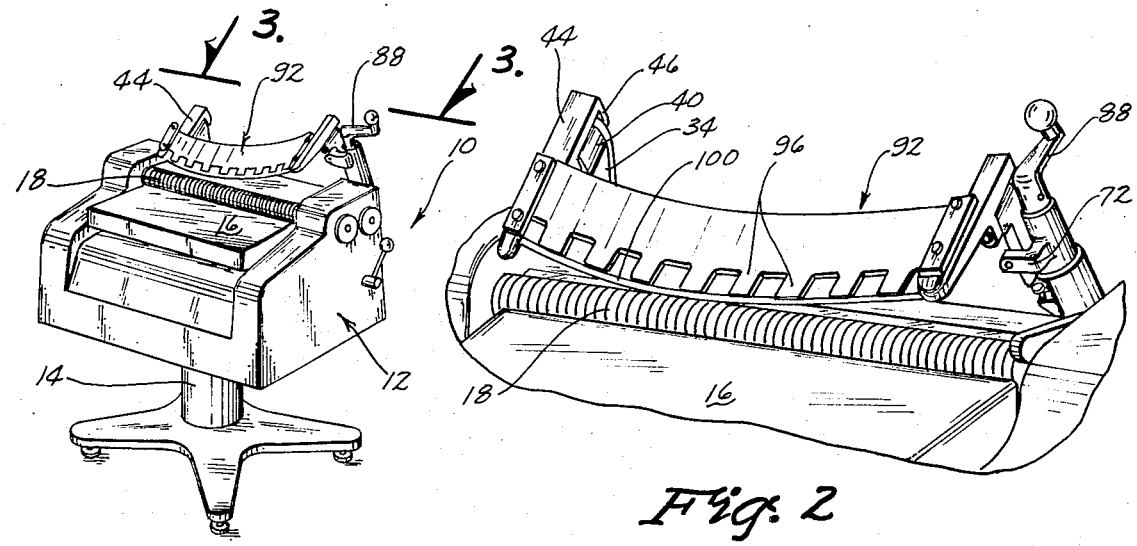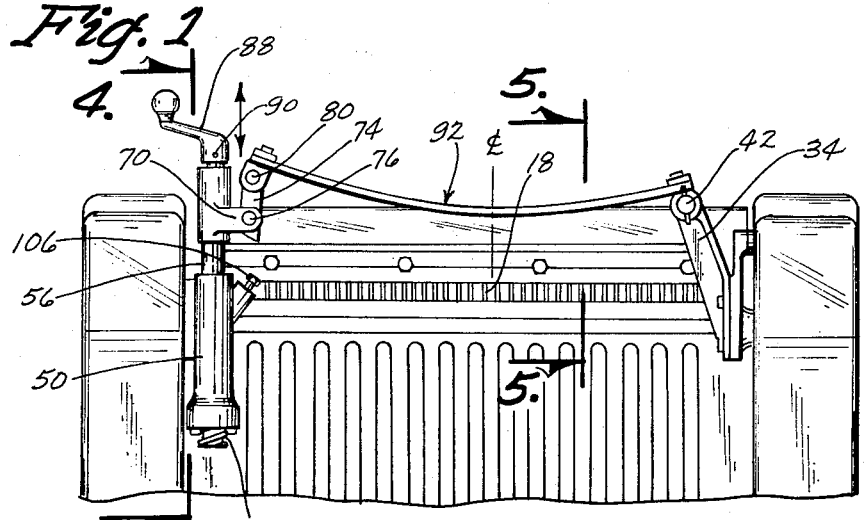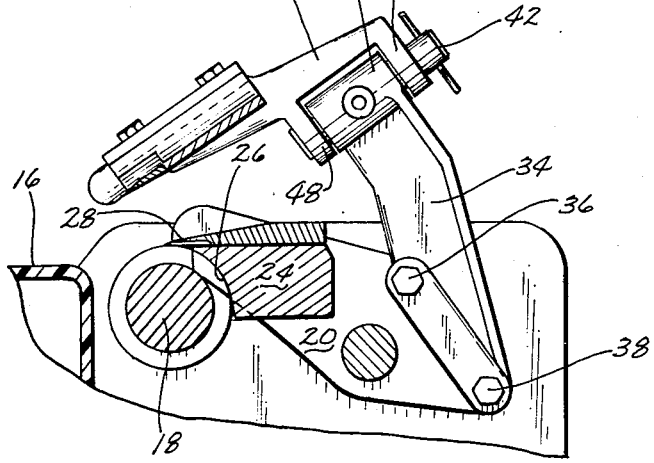

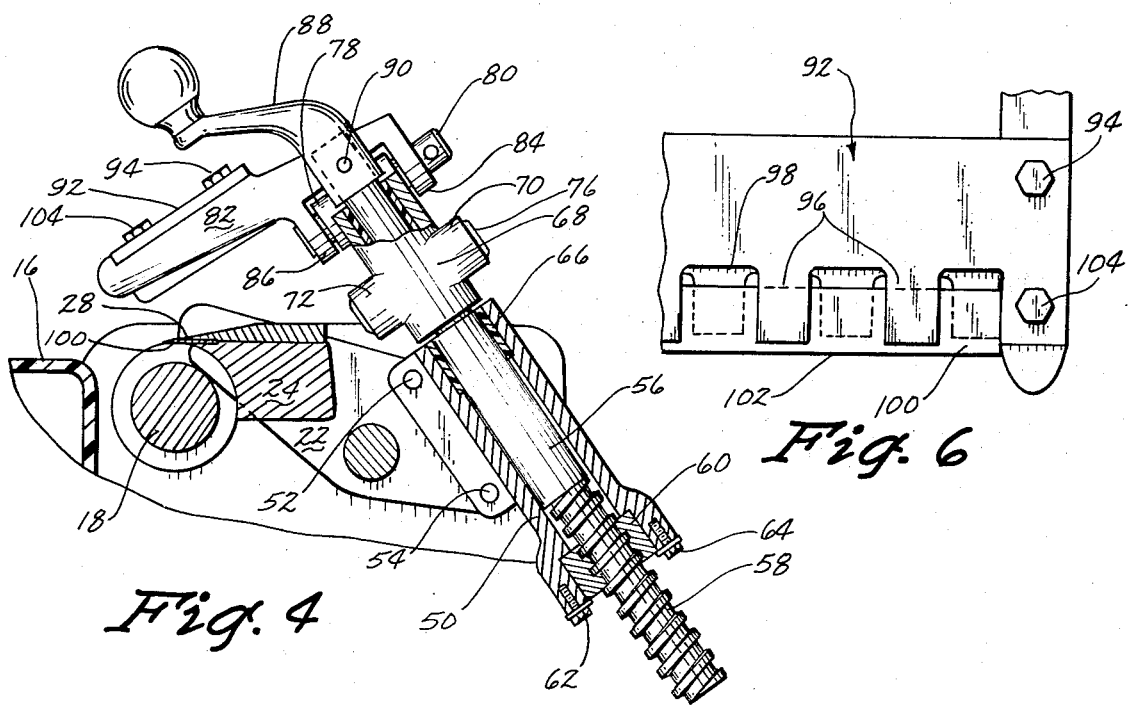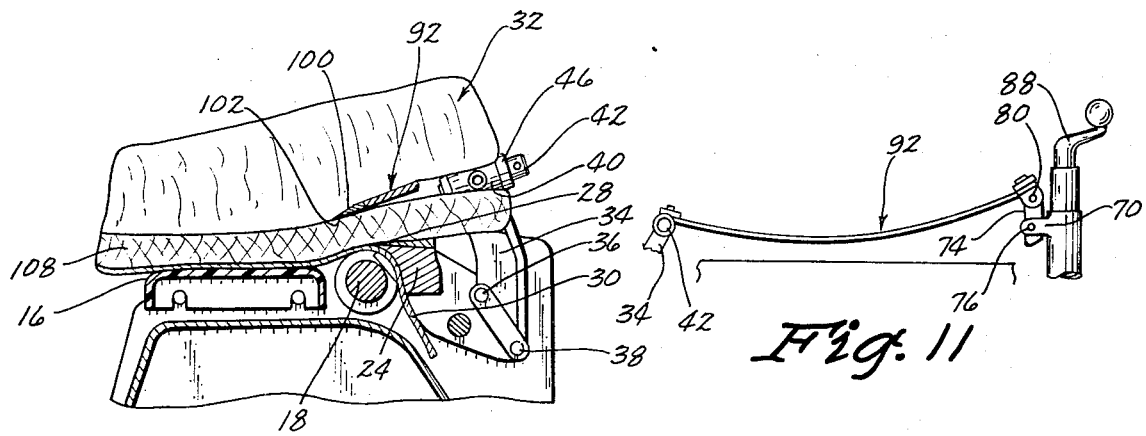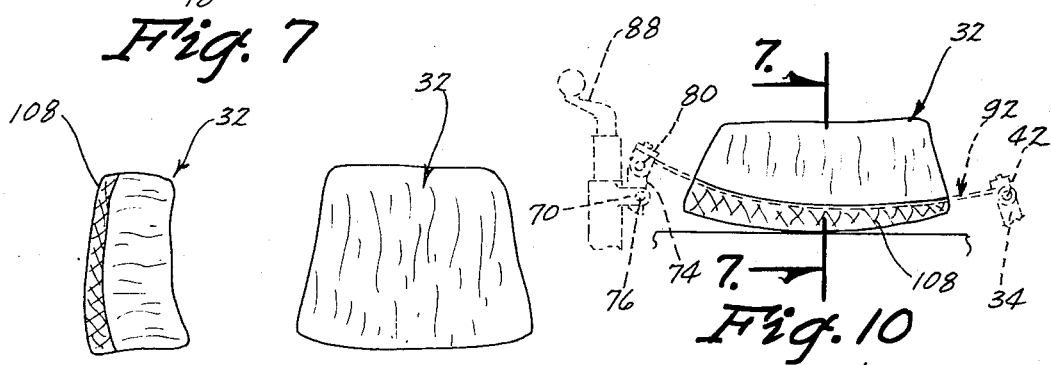
INVENTOR
DONALD L. BEASLEY
BY
Zarley, McKee & Thomte
ATTORNEYS

FATTING ATTACHMENT FOR SKINNING MACHINES

This invention relates to an improvement in the fatting attachment for the skinning machine disclosed in U.S. Pat. No. 2,715,427 of Aug. 16, 1955. This invention relates to a fatting attachment for a skinning machine of the type shown in U.S. Pat. No. Re. 23,222 of Apr. 25, 1950.

The fatting attachment and the skinning machine of the above patents were used primarily to remove skin and fat from hams. The present invention relates to an attachment for a skinning machine which adjustably removes an arcuate layer of fat from pork butts. The straight fatting blade of U.S. Pat. No. 2,715,427 cannot remove arcuate layers of fat from pork butts and thus results in a less than efficient fatting operation. Further, the straight fatting blade of U.S. Pat. No. 2,715,427 does not have the capability to efficiently accommodate pork butts having varying skin and fat thicknesses.

Therefore, it is a principal object of this invention to provide a fatting attachment for skinning machines.

A further object of this invention is to provide a fatting attachment for skinning machines including a curved fatting blade.

A further object of this invention is to provide a fatting attachment for skinning machines and means for selectively adjusting the fatting blade with respect to the skinning blade.

A further object of this invention is to provide a fatting attachment for skinning machines which permits the removal of arcuate layers of fat from pork butts.

A further object of this invention is to provide a fatting attachment for skinning machines which accommodates pork butts having varying skin and fat thicknesses.

A further object of this invention is to provide a fatting attachment for skinning machines including a curved fatting blade which is quickly adjustable toward and away from the skinning blade to vary its depth in the fat, and wherein the fatting blade always maintains the same arc.

A further object of this invention is to provide a fatting attachment for skinning machines which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of a skinning machine having the fatting attachment of this invention mounted thereon;

FIG. 2 is a perspective view of the fatting attachment of this invention mounted in a skinning machine;

FIG. 3 is an enlarged view as seen along lines 3—3 of FIG. 1;

FIG. 4 is an enlarged sectional view as seen along lines 4—4 of FIG. 3 with portions thereof cut away to more fully illustrate the invention;

FIG. 5 is an enlarged sectional view as seen along lines 5—5 of FIG. 3;

FIG. 6 is a fragmentary top elevational view of the fatting blade;

FIG. 7 is a view generally similar to FIG. 5 as seen along lines 7—7 of FIG. 10 illustrating the skinning blade and fatting blade removing a layer of skin and fat from a pork butt;

FIG. 8 is an end view of a pork butt;

FIG. 9 is a top view of a pork butt;

FIG. 10 depicts the curved fatting blade removing an arcuate layer of fat from the pork butt, and FIG. 11 is a partial end view illustrating a modified form of the fatting attachment.

The numeral 10 refers generally to a skinning machine such as disclosed in U.S. Pat. No. Re. 23,222. Machine 10 generally comprises a housing 12 mounted on a pedestal 14. A feed table 16 is mounted forwardly of a feed roller 18, the roller being provided with a plurality of peripheral grooves and gripping teeth. Pressure shoe supports 20 and 22 are pivotally connected at opposite ends of the feed roller as illustrated in FIGS. 4 and 5 and have a pressure shoe 24 secured thereto and extending therebetween. Pressure shoe 24 has an arcuate surface 26 formed at the forward end thereof which is closely positioned adjacent the feed roller 18 to maintain the proper pressure on the skin being removed from the pork butts. A skinning blade 28 is supported by the pressure shoe 24 and is adapted to remove the skin 30 from a pork butt 32. Means (not shown) is provided to maintain the pressure shoe and skinning blade in the proper position with respect to the feed roller and the skin 30.

As seen in FIG. 5, bracket 34 is secured to the rearward end of pressure shoe support 20 by bolts 36 and 38 and extends upwardly and forwardly therefrom. Bracket 34 includes a collar portion 40 at its upper end adapted to receive pin 42 therein. Fatting blade support 44 is pivotally connected to the bracket 34 by means of the pin 42 extending through ears 46 and 48 in the manner illustrated in FIG. 5.

Collar 50 is secured to the rearward end of pressure shoe support 22 by bolts 52 and 54 as illustrated in FIG. 4. Adjustment screw 56 extends through collar 50 and has a threaded lower end portion 58 threadably extending through a boss 60 secured to the lower end of collar 50 by bolts 62 and 64. Bushing 66 is provided at the upper end of collar 50 and embraces the cylindrical portion of the adjustment screw 56. Yoke 68 rotatably embraces the upper end portion of screw 56 and has a pair of yoke arms 70 and 72 extending inwardly therefrom in a spaced apart relationship. Arm 74 is received between the yoke arms 70 and 72 and is pivotally connected thereto by means of pin 76 extending therethrough. Arm 74 has a collar 78 provided at its upper end adapted to receive the pin 80 therein. Fatting blade support 82 is pivotally connected to the collar 78 by means of pin 80 extending through ears 84 and 86 in the manner illustrated in FIG. 4. Crank handle 88 is secured to the upper end of adjustment screw 56 by pin 90 to provide a quick means for threadably rotating the adjustment screw 56 in the boss 60 to raise and lower the yoke 68 with respect to the collar 50.

Fatting blade 92 is secured to the fatting blade supports 44 and 82 by bolts 94 and extends therebetween. Fatting blade 92 includes a plurality of spaced apart upper teeth 96 and a plurality of spaced apart lower teeth 98 which are vertically spaced from the teeth 96 and which are staggered with respect thereto. A replaceable blade member 100 is received between the upper teeth 96 and lower teeth 98 as illustrated in FIG. 6 and has its leading edge 102 positioned forwardly thereof. The blade member 100 is secured to the fatting blade 92 and supports 44 and 82 by bolts 104. The yoke 68 is limited in its downward movement by means of an adjustment screw means 106 adapted to engage the lower end of arm 74 to prevent the fatting blade 92 from being moved too closely adjacent the skinning blade. As seen in FIGS. 2 and 3, the fatting blade 92 is curved along its length.

In operation, the machine 10 is used to simultaneously remove the skin 30 and a layer of fat 108 from the pork butt 32. The pork butt 32 is placed on the feed table 16 so that the skinning blade 28 can remove the skin 30 from the pork butt 32 and so that the fatting blade 92 can remove an arcuate layer of fat 108 from the pork butt. The rotation of the adjustment screw 56 by means of the crank handle 88 permits the adjustment of the curved fatting blade 92 toward or away from the skinning blade to vary the depth of the fatting blade in the fat. The raising of the yoke 68 with respect to the collar 50 causes the left end (as viewed in FIG. 3) of the fatting blade 92 to be raised and pivoted about the pin 80 which causes the fatting blade 92 to be moved away from the skinning blade. The raising of the left end of the fatting blade 92 causes the right end of the fatting blade to pivot about pin 42. The movement of the fatting blade 92 away from the skinning blade permits the fatting blade 92 to remove a thicker layer of fat from the pork butt. The curved fatting blade more closely conforms to the shape of the pork butt as seen in FIGS. 8, 9 and 10. When a pork butt having a tick skin and layer of fat is encountered, the fatting blade 92 is raised with respect to the skinning blade with the pork butt being moved to one side of the lowermost portion of the fatting blade.

Thus it can be seen that a unique fatting attachment has been provided for skinning machines which permits the attachment to accommodate pork butts having various skin and fat thicknesses. The attachment to this invention permits the removal of an arcuate layer of fat from the pork butt which results in a more efficient skinning and fatting operation being performed. FIG. 11 merely illustrates the fact that the crank handle and associated structure can be mounted at the opposite end of the fatting blade to provide a "left-hand" arrangement.

Thus it can be seen that the attachment accomplishes at least all of its stated objectives.

I claim:

1. A fatting attachment for skinning machines, comprising,
   an elongated fatting blade having opposite ends,
   means for mounting said fatting blade on the skinning machine adjacent a skinning blade thereof so that said fatting blade is adjustable toward or away from the skinning blade to vary its depth in the fat,
   said fatting blade being curved along its length to permit the fatting blade to remove an arcuate piece of fat,
   said skinning machine comprising an elongated pressure shoe which supports said skinning blade, first and second brackets secured to opposite ends of said pressure shoe, one end of said fatting blade being pivotally secured to said first bracket, a boss secured to said second bracket, an adjustable screw means threadably mounted in said boss and extending upwardly therefrom, the other end of said fatting blade being rotatably and pivotally connected to said adjustment screw means at the upper end thereof.

2. The attachment of claim 1 wherein a stop means is secured to said boss for limiting the movement of said fatting blade towards the skinning blade.

3. A fatting attachment for skinning machines having a skinning blade thereon, comprising,
   an elongated fatting blade having opposite ends,
   a first support means secured to said machine adjacent one end of said skinning blade and extending upwardly therefrom,
   a second support means secured to said machine adjacent the other end of said skinning blade and extending upwardly therefrom,
   said fatting blade being pivotally secured at its said one end about a vertically fixed axis to said first support means,
   said second support means including height adjustable mounting means operatively pivotally secured to said end of said fatting blade whereby said other end of said fatting blade may be selectively raised and lowered with respect to said skinning blade, said height adjustable mounting means comprising a double pivot linkage means which interconnects said adjustment means and said other end of said fatting blade,
   said fatting blade being curved along its length to permit the fatting blade to remove an arcuate piece of fat.

4. The attachment of claim 3 wherein the center of said fatting blade is offset laterally with respect to the center of said skinning blade and wherein said fatting blade is uniformly curved, said height adjustable mounting means in the same relative arcuate position with respect to said skinning blade regardless of the adjusted position of said fatting blade with respect to said skinning blade.

* * * * *